United States Patent
Avakian et al.

(10) Patent No.: US 7,107,424 B1
(45) Date of Patent: Sep. 12, 2006

(54) MEMORY READ STROBE PULSE OPTIMIZATION TRAINING SYSTEM

(75) Inventors: Armen D. Avakian, Natick, MA (US); Adam C. Peltz, Grafton, MA (US); Krzysztof Dobecki, Framingham, MA (US); Gregory S. Robidoux, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 313 days.

(21) Appl. No.: 10/809,733

(22) Filed: Mar. 25, 2004

(51) Int. Cl.
*G06F 13/00* (2006.01)
*G06F 13/43* (2006.01)
*G11C 7/00* (2006.01)
*G06F 1/04* (2006.01)
*G06F 1/06* (2006.01)
*G06F 1/08* (2006.01)

(52) U.S. Cl. ............... 711/167; 711/168; 711/169; 713/400; 713/401; 713/500; 713/503; 365/193; 365/194

(58) Field of Classification Search .......... None
See application file for complete search history.

(56) References Cited

U.S. PATENT DOCUMENTS

| | | | |
|---|---|---|---|
| 6,646,929 B1 * | 11/2003 | Moss et al. | 365/194 |
| 6,658,523 B1 * | 12/2003 | Janzen et al. | 711/105 |
| 6,735,709 B1 * | 5/2004 | Lee et al. | 713/401 |
| 6,889,334 B1 * | 5/2005 | Magro et al. | 713/500 |
| 6,941,433 B1 * | 9/2005 | Libby et al. | 711/167 |
| 7,016,240 B1 * | 3/2006 | Avakian et al. | 365/193 |

* cited by examiner

*Primary Examiner*—Reginald G. Bragdon
*Assistant Examiner*—Shawn Gu

(57) ABSTRACT

A method for determining a read strobe pulse delay for data read from a memory having a plurality of memory chips. Each one of the chips provides data along with an associated read strobe pulse. The data read from each one of the plurality of chips is stored in a corresponding one of a plurality of storage devices in response to the read strobe pulse associated with such one of the plurality of chips. A training system determines a delay which when applied in to the plurality of read strobe pulses enables valid read data from the plurality of memory chips to be stored in each one of the plurality of the storage device in response to the read strobe pulses being delayed by the read pulse strobe delay. A process is used to enable preservation of the user data during the training process for use subsequent to the training process.

3 Claims, 8 Drawing Sheets

MEMORY READ STROBE PULSE OPTIMIZATION TRAINING SYSTEM

TECHNICAL FIELD

This invention relates to memory systems, and more particularly to memory read strobe pulse optimization training systems.

BACKGROUND

As is known in the art, many data systems include Double Data Rate (DDR) SDRAM memories. In many data systems several DDR SDRAM chips are used. Reading of data from a DDR SDRAM memory system is accomplished with each SDRAM chip producing in response to a read command its own read strobe pulse. The read strobe pulse from each chip is used to strobe the data, typically a nibble, read from that chip into a storage device (i.e., sampler) associated with that chip. The read strobe is produced at the leading edge of a valid data window, or eye, of the data, i.e., nibble. While ideally, in response to the read data command, all of the chips in the memory system should provide the data read therefrom to a data bus at the same time and produce all of the read strobe pulses at the same time, because of chip mismatches, board layout and internal timing skews, the data provided on the data bus from each of the chips may have time delays one from the other and the read strobe pulses may also have time delays one from the other.

It is also known in the art that it is desirable to strobe the data into the sampler at the center of the valid data window the strobe which, as noted above is delayed one half of the window period. This one-half period delay is applied to all the read strobe pulses. Therefore, because of the variation in the time each nibble is provided to its sampler and the time variations of the read strobe pulses, valid data may not be sampled into one or more of the samplers.

SUMMARY

In accordance with the present invention, a method is provided for determining a read strobe pulse delay for data read from a memory having a plurality of memory chips. Each one of the chips provides data along with an associated read strobe pulse. The data read from each one of the plurality of chips is stored in a corresponding one of a plurality of storage devices in response to the read strobe pulse associated with such one of the plurality of chips. The method includes monitoring read requests for the memory from a plurality of resources and from a read pulse strobe delay training system. The method grants access to the memory to the read pulse strobe delay training system in response to the request from the strobe read pulse delay training system. The method operates the training system when such system has been granted access to the memory to determine the read strobe pulse delay. The delay is applied to the plurality of read strobe pulses to enable valid read data from the plurality of memory chips to be stored in each one of the plurality of the storage device in response to the read strobe pulses being delayed by the read pulse strobe delay. The plurality of read strobe pulses are delayed by the determined read pulse strobe delay when read data is subsequently provided from the memory for use by the plurality of resources.

In one embodiment, the training system operation comprises: (a) loading, in response to the training request signal, a predetermined data into the plurality of chips of the memory at a predetermined address; (b) setting a delay applying the read strobe pulses to the plurality of storage devices at an initial delay; (c) reading data from the memory chips at the predetermined address; (d) storing the read data into the storage device in response to the applied delay; (e) reading the stored data from the storage device; (f) comparing the data read from the storage device to the predetermined data to determine whether the read data is valid or invalid; (g) changing the delay applied to the plurality of read strobe pulses; (h) repeating steps (c) through (g) for a predetermined number of delays; (i) determining the strobe pulse delay in accordance a predetermined number of valid data read consecutively from the storage device; and (j) subsequently applying the determined strobe pulse for the read strobe pulses.

In accordance with another feature of the invention, a method is provided for determining a read strobe pulse delay for data read from a memory having a plurality of memory chips. Each one of the chips provides data along with an associated read strobe pulse. The data read from each one of the plurality of chips is stored in a corresponding one of a plurality of storage devices in response to the read strobe pulse associated with such one of the plurality of chips. The method includes: (a) loading, in response to a training request signal provided by the system during operation of the system in processing the user data, a predetermined data into the memory at a predetermined address; (b) setting a delay to the read strobe pulses at an initial delay; (c) reading data from the memory chips at the predetermined address; (d) storing the read data into the storage device in response to the applied delay; (e) reading the stored data from the storage device; (f) comparing the data read from the storage device to the predetermined data to determine whether the read data is valid or invalid; (g) changing the delay applied to the plurality of read strobe pulses; (h) repeating steps (c) through (g) until a predetermined number of delays; (i) determining the strobe pulse delay in accordance with a time window having a predetermined number of valid data read consecutively from the storage device; and (j) subsequently using the determined strobe pulse delay in subsequently processing the user data until the occurrence of a subsequent training signal.

In accordance with another feature of the invention, a method is provided for determining a read strobe pulse delay for data read from a memory having a plurality of memory chips. Each one of the chips provides data along with an associated read strobe pulse. The data read from each one of the plurality of chips is stored in a corresponding one of a plurality of storage devices in response to the read strobe pulse associated with such one of the plurality of chips. The method includes (a) storing data written into the memory from the plurality of resources having a predetermined address into both the memory and into a local memory device; (b) monitoring requests for the memory from a plurality of resources and from a strobe delay training system; (c) granting the strobe delay training system access to the memory in response to a request from such training system; (e) operating the access granted strobe delay training system to determine the read strobe pulse delay; (d) subsequently writing the data stored in the local memory device back into the memory at the predetermined location.

In one embodiment, the method the training system operation comprises: (a) operating the training system when such system has been granted access to the memory to determine the read strobe pulse delay, such strobe pulse delay being when the data from the plurality of memory chips and stored in the plurality of storage devices in response to the read strobe pulses is valid; and (b) using the determined strobe pulse delay for read subsequently from the memory for use by the plurality of resources.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings-indicate like elements.

DETAILED DESCRIPTION

Figure 1:
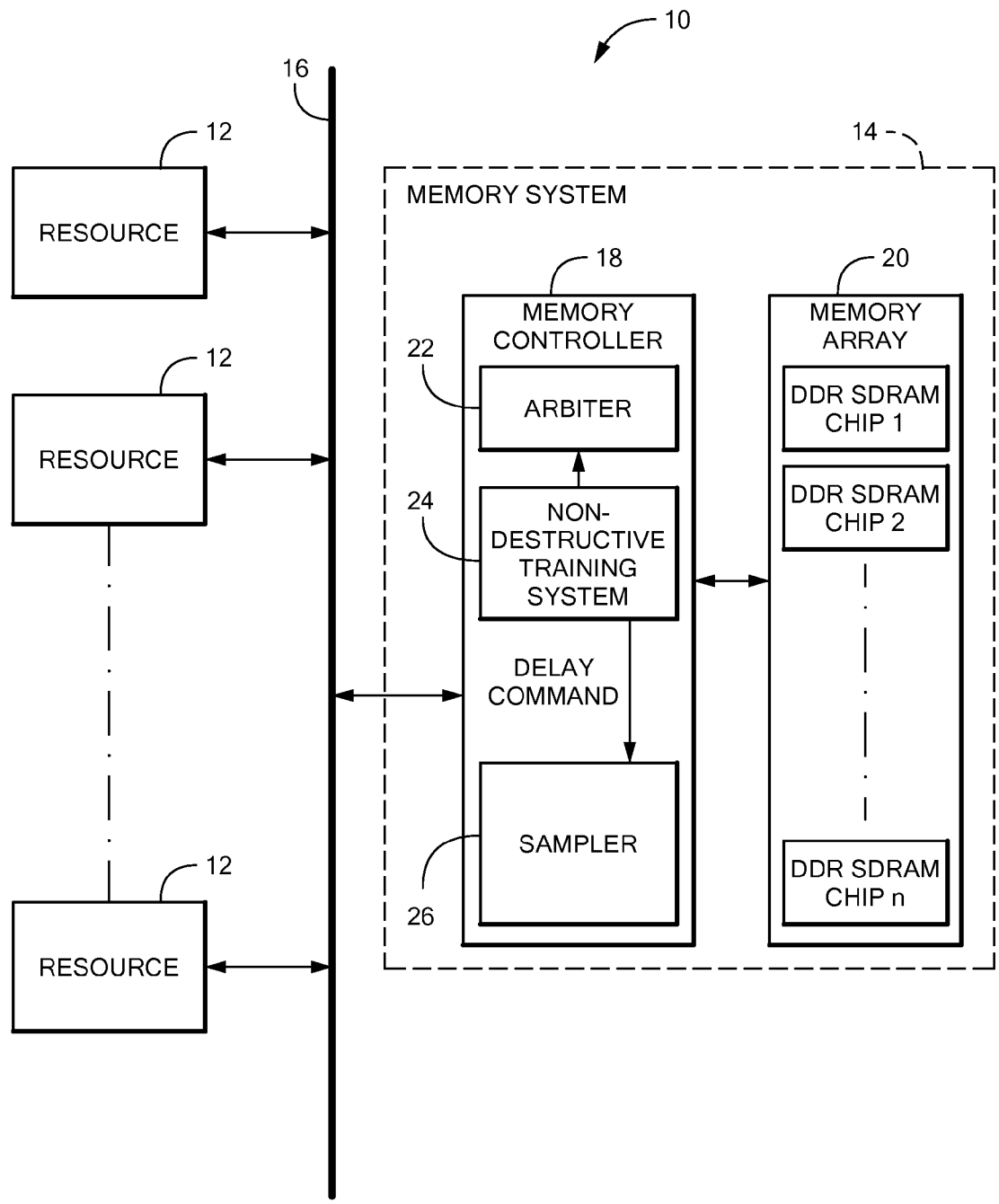
FIG. 1 is a block diagram of a data system according to the invention.

Referring now to FIG. 1, a data system 10 for processing user data is shown to include a plurality of resources 12, for example user data processors or controllers, coupled to a memory section 14 through a bus 16. The memory section 20 includes a memory controller 18 and a memory 20, here an array of memory chips, here n, DDR SDRAM chips, chip 1 through chip n. Here, each memory chip 1 through chip n stores a nibble of the data. The memory controller 18 will be described in more detail in connection with FIG. 3. Suffice it to here, however, that the memory controller 18 includes an arbiter 22, a non-destructive training system 24 and a sampler 26. As will be described in more detail below, during a training mode request, the arbiter 22 grants the non-destructive training system 24 accesses to the memory 20. As will be described in more detail in connection with FIGS. 4 and 5, the training system 24 determines an optimum delay $\Delta_O$ for the read strobe pulses fed to the sampler 26. The optimum delay $\Delta_O$ is a delay which enables the sampler 26 to store, in response to the optimally delayed read strobe pulses, valid nibble data from each of the chips chip 1 through chip n.

Figure 2:
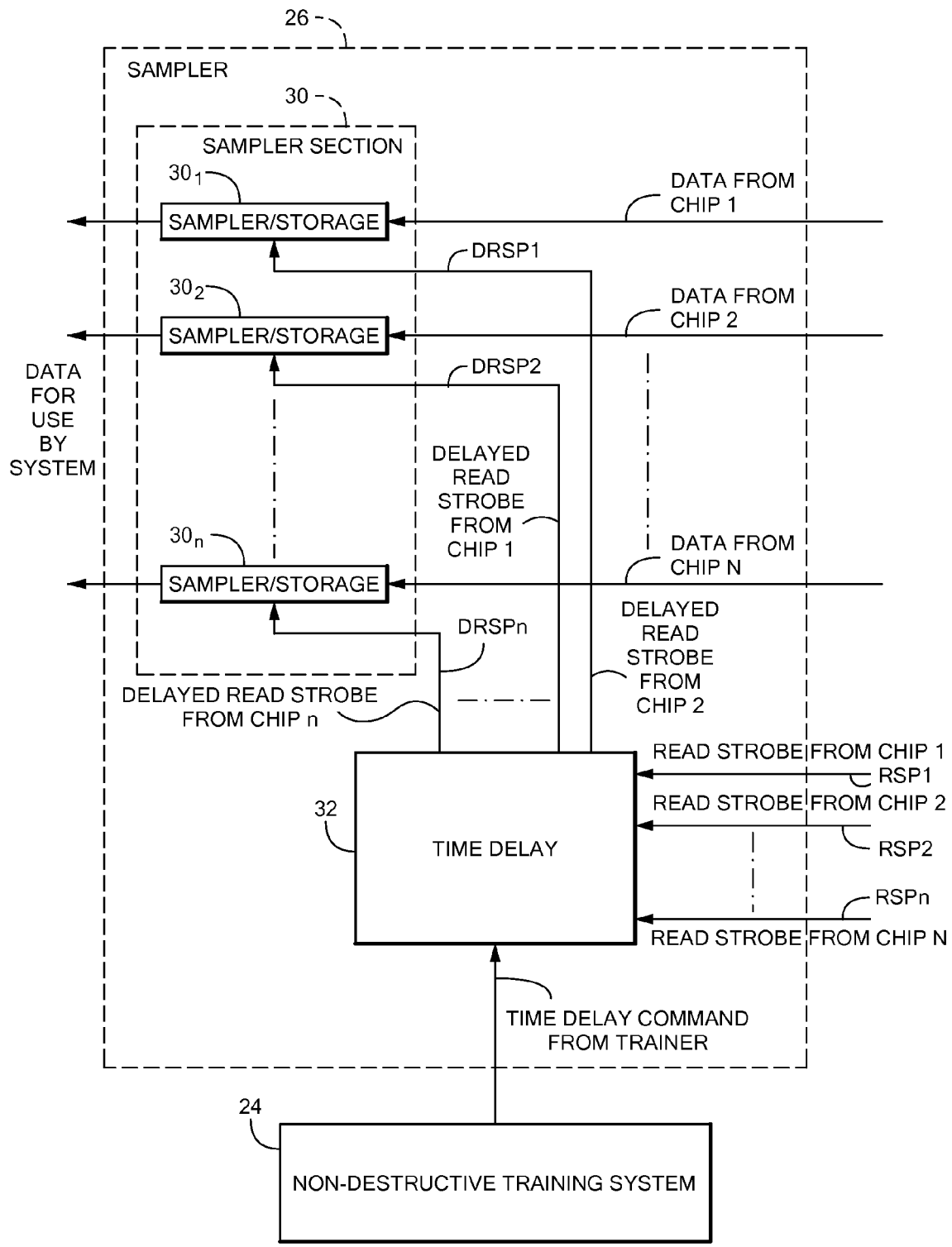
FIG. 2 is a block diagram of a sampler according to the invention and used in the system of FIG. 1.
Figure 2A:
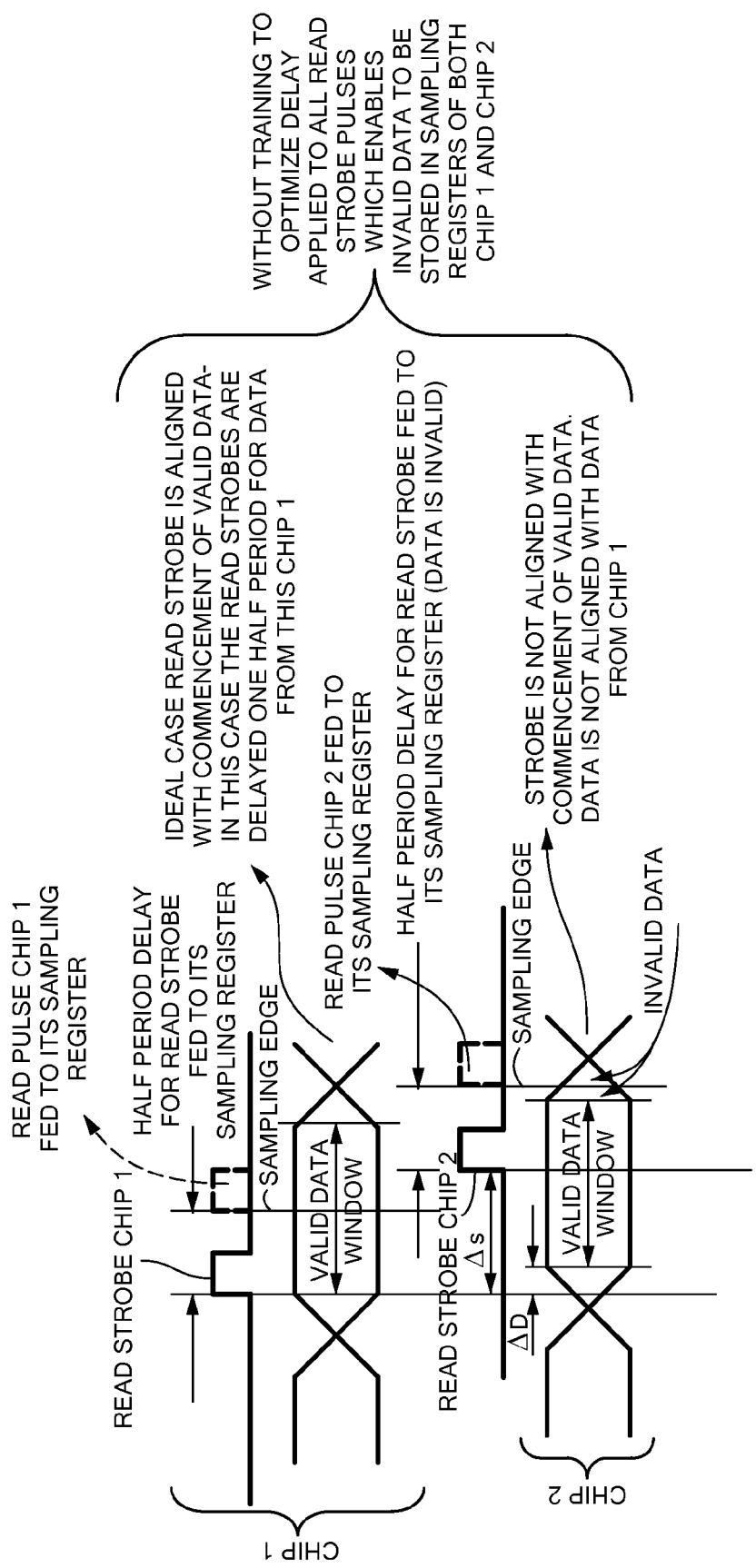
FIG. 2A is a timing diagram showing read nibbles read from a pair of memory chips used in a memory system of FIG. 1 along with read strobe pulses produced by such chips, such read strobe pulses being passed though a common delay having a delay time selected to store the read data from one of the chips into its sampler at the middle of such data's valid data window, such delay resulting in invalid data being stored in the sampler of the sampler for data read from the other one of the chips.

Referring now to FIG. 2, the sampler 26 is shown in more detail to include a sampler section 30 having a plurality of, here n, samplers $30_1$–$30_n$, each one being fed a nibble of data from a corresponding one of the chips, chip 1 through chip n, respectively. The read strobe pulses RSP1 through RSPn from the plurality of chips 1 through n, respectively, are fed to a time delay network 32. The amount of time delay, $\Delta$, applied to all of the read strobe pulses RSP1 through RSPn is determined from a delay command signal fed to the time delay network 32 by the non-destructive training system 24. Suffice it to say here, however that the time delay, $\Delta$, results in the time delay 32 producing time delayed read strobe pulses DRSP1 through DRSPn in response to read strobe pulses RSP1 through RSPn, respectively. Each one of the samplers $30_1$ through $30n$ stores a nibble of data fed thereto from chip 1 through chip n, respectively, in response to delayed read strobe pulses DRSP1 through DRSPn, respectively Thus, referring to FIG. 2A, the nibble of data read from chip 1 in response to a read command and the read strobe pulse associated with the nibble read from chip 1 are shown in the upper portion of FIG. 2A. It is noted that here, for purposes of understanding, an ideal chip response is shown for chip 1 and thus the read strobe pulse and the leading edge of the read nibble are in alignment. Under such ideal condition, the optimum time delay which should be applied to the strobe pulse for chip 1 (RSP1) would be a $\Delta$ of one half a nibble read period so that the leading, i.e., sampling edge, of the delayed read strobe pulse (DRSP1) for the nibble read from chip 1 is in the middle of the valid nibble data window, as shown by the dotted delayed read strobe pulse (DRSP1) fed to sampler $30_1$. Thus, the dotted read strobe pulse (DSRP1) is the delayed read strobe pulse (RSP1) produced by the delay network 32 and fed to the sampler $30_1$. However, it is noted that the valid nibble data from, in this example, chip 2, shown in the lower portion of FIG. 2A, is delayed from the valid nibble data from chip 1 and amount $\Delta_D$, and the read strobe pulse (RSP2) from chip 2 is delayed $\Delta_S$ from the read strobe pulse from chip 1. Thus, if, in this example, the same $\Delta$ of one-half nibble read period were also applied to the read strobe pulse (RSP2) of chip 2, the resulting delayed read strobe pulse from chip 2 (DRSP2), shown dotted, would be fed to the sampler $32_2$. It is noted in the lower portion of FIG. 2A that, in this example, the leading the leading, or sampling edge of delayed read strobe pulse (DRSP2) would result in invalid nibble data from chip 2 being stored in sampler $32_2$.

Figure 2B:
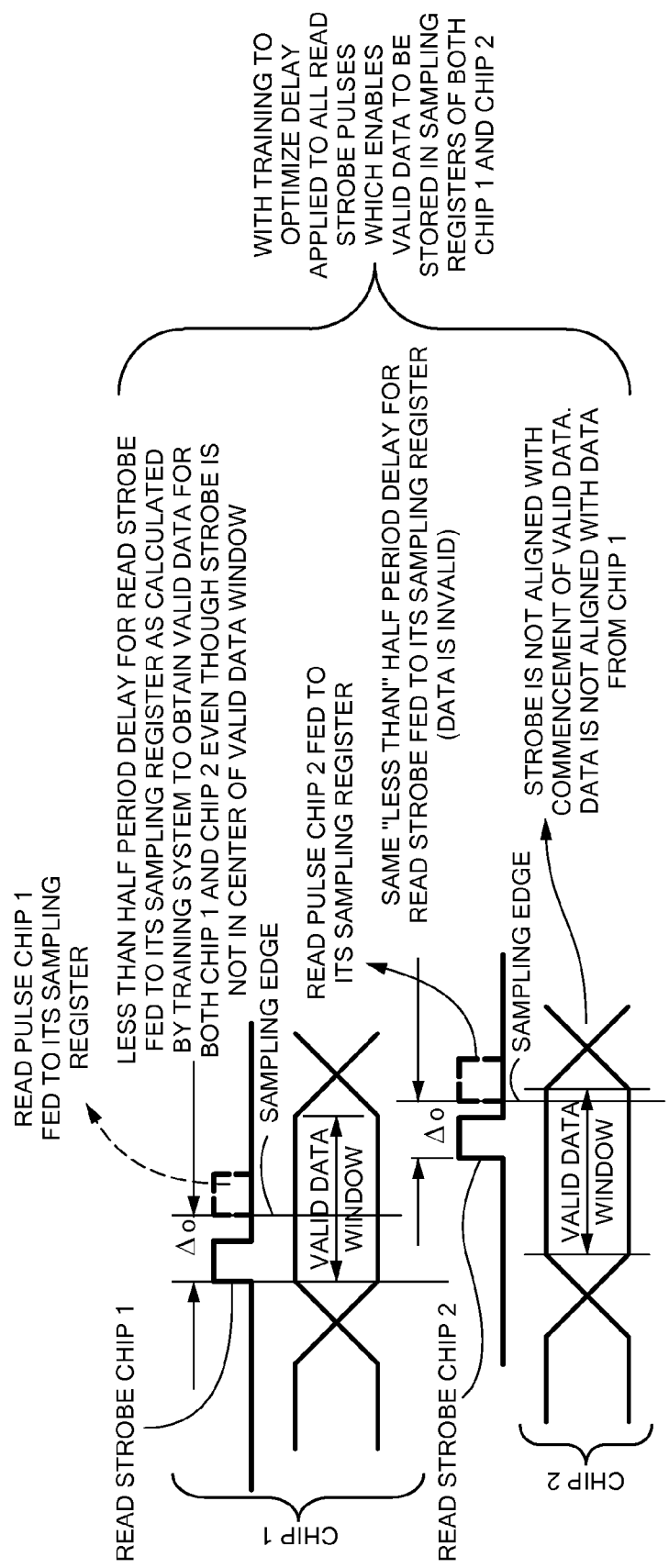
FIG. 2B is a timing diagram showing the nibbles read from the pair of memory chips of FIG. 2A along with read strobe pulses produced by such chips, such read strobe pulses being passed though a common delay having a delay time selected to store the valid read data from both chips into their samplers, such delay being determined by a non-destructive training system according to the inventions.

Referring to FIG. 2B, the non-destructive training system 24 (FIG. 2) operates to determine a delay which will enable valid nibble data from chip 1 and valid nibble data from chip 2 to be stored in samplers $30_1$ and $30_2$, respectively. Thus, in the example shown in FIG. 2B, the delay fed by the training system 26 to the time delay network 32 (FIG. 2) is less than one-half nibble read period. Thus, while here the sampling edge of the delayed read strobe pulse (DRSP1) is not in the middle of the valid data window for the nibble read from chip 1 it is still within the valid data window for the nibble read from chip 1 and this "compromise" has allowed valid nibble data read from chip 2 to also be strobed into the sampler $30_2$ when valid nibble data is fed to such sampler $30_2$. Thus, while neither the leading edge of DRSP1 or DRSP2 is in the middle of the valid nibble data window of chip 1 or chip 2, the delay allows sampling valid data for both the nibble read from chip 1 and the nibble read from chip 2.

Figure 3:
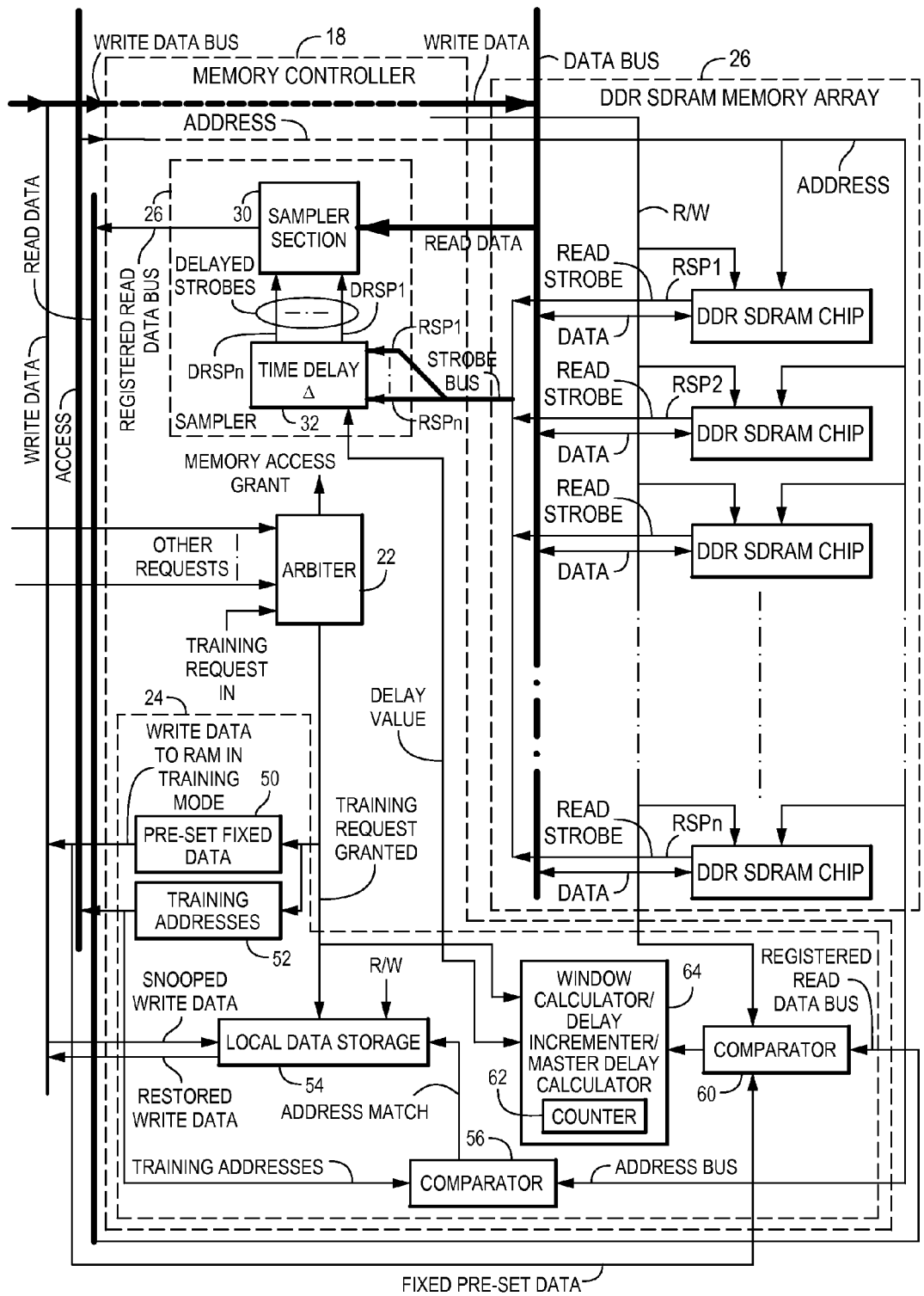
FIG. 3 is a block diagram showing in more detail a memory controller used in the system of FIG. 1 along with its training system, arbiter, sampler, and memory array.

Referring now to FIG. 3, the memory controller 18 (with the training system 24, arbiter 22 and sampler 26) and memory array 20 are shown in more detail. The training system 24 is shown to include a register 50 for storing a pre-set fixed data having n nibbles for storage in a corresponding one of the chips 1 through n. The training system 24 also includes a register 52 for storing a pre-set address to memory array 20. This address is used as the address for the fixed data stored in register 50.

In response to a training request, either at start-up of the system 10 (FIG. 1) or during a time when the resources 12 (FIG. 1) of memory system 14 are detecting a large, predetermined number of data errors, a training request is supplied to the arbiter 22. Thus, this request may, at start-up, be activated in response to a manual start-up command, or from the resources 12 as they process user data or from the memory system 20 as it processes user data.

At the appropriate time, the arbiter grants the training system 24 access to the memory system 20. More particularly, when access is granted, the pre-set data in register 50 becomes stored in the chips 1 though n at the pre-set address stored in register 52. As will be described in connection with FIG. 3 and FIG. 4, the training process loads a fixed data word in register 50 into the pre-set address stored in register 52. However, that pre-set address may have in it users data as when the training process is initiated at the request of one of the resources 12 (FIG. 1). Thus, in order to preserve the user data in the memory system 20, prior to the initiation of the training process (i.e., prior to the fixed data word in register 50 into the pre-set address stored in register 52), a copy of the most recent user data stored in the memory system 20 at the pre-set address is stored in a local register 54. At the end of the training process, the user data stored in register 54 is returned to its previous location in the memory system 20.

More particularly, the most recent data being written into the memory system 20 (i.e., into the chips 1 through n) at the pre-set address stored in the register 52 prior to the training system 24 being granted access to the memory system 20 is stored on a local data storage register 54. In this way, user data having the pre-set address will be preserved, i.e., not destroyed during the training process. Thus, the address on the address bus portion of bus 16 (FIG. 1) is monitored or "snooped" by a comparator 56. Also fed to the comparator 56 is the pre-set address stored in register 42. When the pre-set address is the same as the address the data on the data portion of bus 16 becomes stored in the local data storage register 54. It is noted that the training request grant signal from the arbiter 22 is also fed to the local data storage register 54. Thus, prior to the training process, the most recent copy of the user data which had been written into the memory system 20 at the pre-set address is stored in register 54; however, this data in the register 54 is not changed during the training process. After the training process, the most recent copy of the user data now stored in register 54 is returned to the memory system 20, i.e., re-written into the memory system 20 at the pre-set address stored in register 50. Thus, the training process is non-destructive of the user data.

Figure 5:
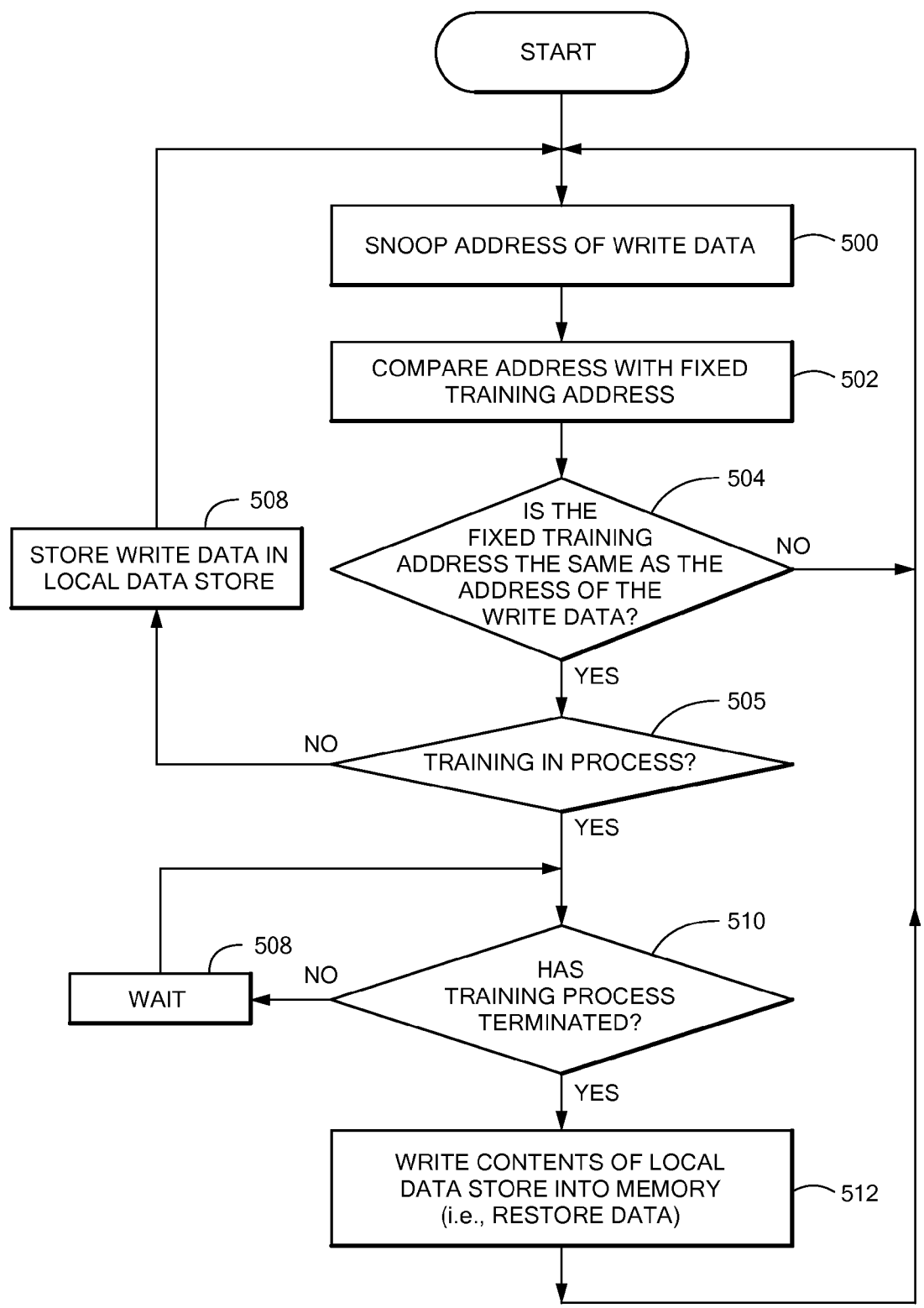
FIG. 5 is a flow diagram of the method used by the training system of FIG. 2 in enabling the training system to prevent destruction of data used by the system of FIG. 1.

The process described above for preserving user data during the training process is described in FIG. 5. Thus, in Step 500, the address of data being written into the memory system 20 is monitored, or "snooped". The snooped address is compared with the pre-set address stored in register 52 by comparator 56 in Step 502. If the snooped address is different from the pre-set address, Step 504, the address snooping continues. On the other hand, if the snooped address is the same as the pre-set address, Step 504, and if the training process is not active, Step 506, a copy of the data being written into the memory system 20 is written into the local data storage register 54, Step 508.

On the other hand, if the snooped address is the same as the pre-set address, Step 504, and if the training process was active, Step 506, and has not been terminated, Step 510, the training process continues and register 54 maintains the copy of the data last stored in the memory system 20, Step 511.

On the other hand, if the snooped address is the same as the pre-set address, Step 504, and if the training process was active, Step 506, and has now been terminated, Step 510, the copy of the data last stored in the memory system 20 is returned to the memory system 20, Step 512. That is, in Step 512, the data stored in register 54 is returned to the system memory 30 at is previous address.

Figure 4:
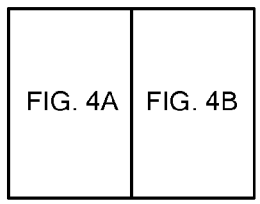
FIG. 4 is a flow diagram of the method used by the training system of FIG. 2 in determining an optimum time delay $\Delta_O$ for the delaying read strobe pulses of FIG. 2B.
Figure 4A:
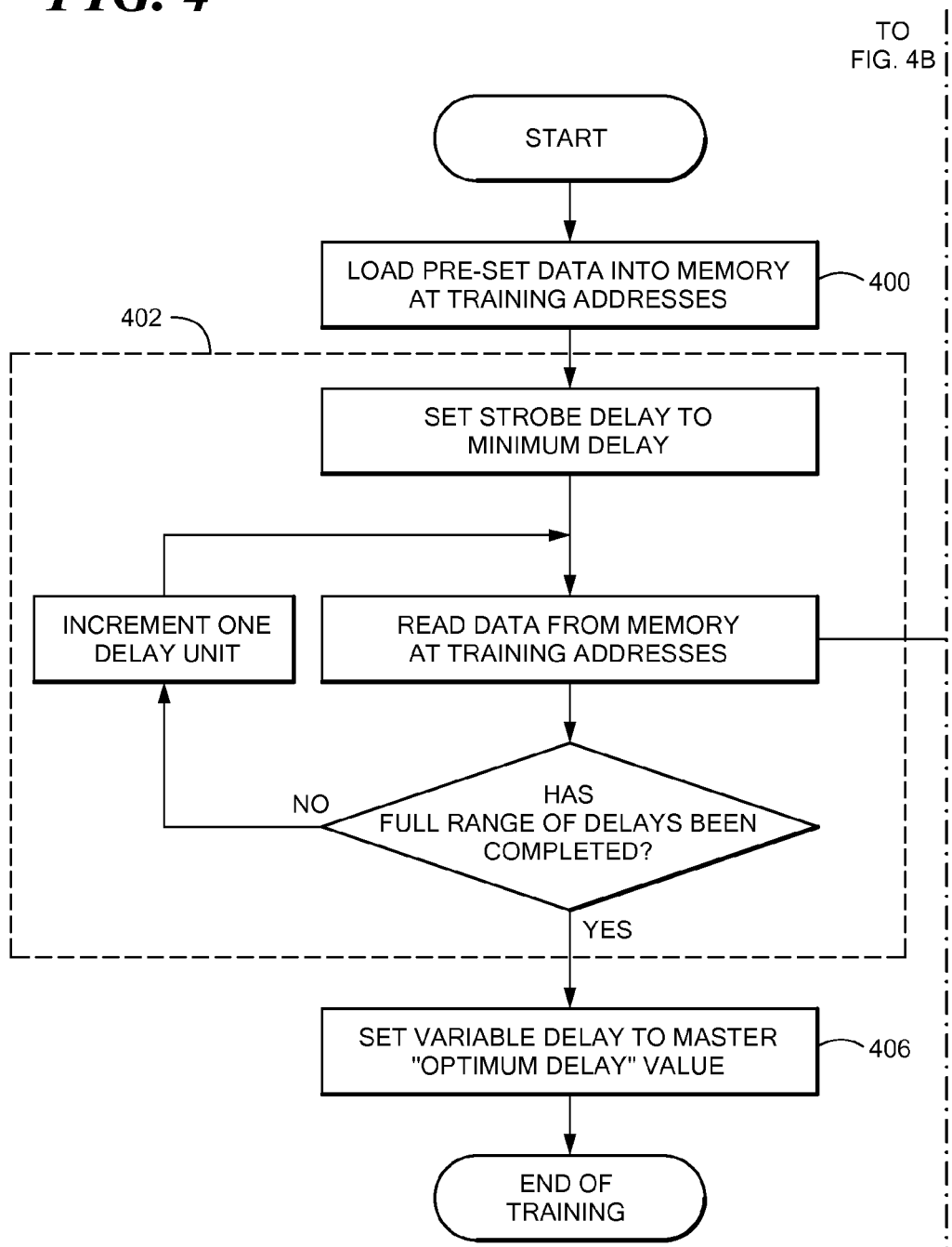
Figure 4B:
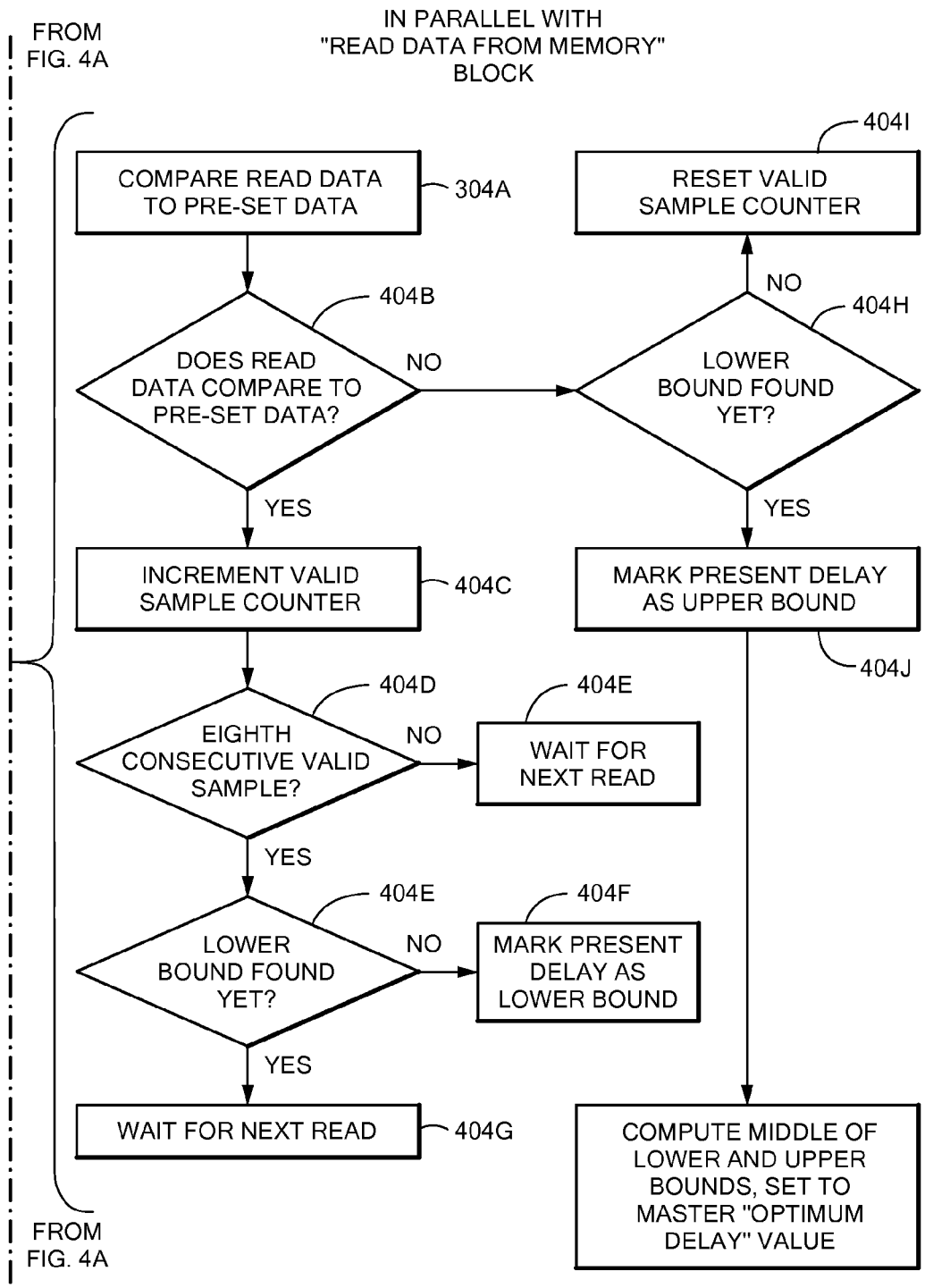

Referring now to FIGS. 3 and 4, the training process will be discussed. In step 400, when the arbiter grants the training system 24 access to the memory system 20, the pre-set data in register 54 is loaded into the memory system 20 at the pre-set address stored in register 53. As noted above in connection with FIG. 6 (is there a FIG. 6?), a copy of any user data at this address is first stored in register 54.

In Step 402, and referring to FIGS. 2 and 3, the training system 24 applies a minimum delay command to the time delay, $\Delta_{min}$. This minimum time delay $\Delta_{min}$ is set so that invalid data will be stored in at least one of the samplers $30_1$–$30_n$. Thus, when the nibbles from chips 1 though n are stored in samplers $30_1$–$30n$ in response to the delayed read strobe pulses DRSP1–DRSPn, respectively, and such read nibbles are compared with the respective nibbles of the pre-set word stored in register 52 in a comparator 60, an error in at least one of the nibbles will be detected.

More particularly, referring also to FIG. 4, in Step 404, the data at the pre-set address in register 52 is read from the chips 1 though n of the memory system 20. The process increments the delay one predetermined time delay unit until a full range of delays has been applied by the time delay 32. The process is designed so that initially delays are used by the time delay 32 which result in a sequence of at least one of invalid nibble sample being stored in the samplers $30_1$–$30_n$, followed by a sequence of at least a predetermined number of delays which result in valid data being stored in samplers $30_1$–$30_n$, (i.e., if each one the nibbles read are is the same as the corresponding nibble in the pre-set word), followed by a sequence of at least one of invalid nibble sample being stored in the samplers $30_1$–$30_n$. This enables clear detection of a range, or window, (or eye) of time delays of valid data being stored in the sampler section 30, the first delay of the window being the lower boundary of the window and the last delay of the window being the upper boundary of the window. The mean of the upper and lower boundary delays is the optimum delay and will be used in subsequent user data processing.

More particularly, in Step 404A, the read data stored in the samplers $30_1$–$30_n$ in response to the $\Delta_{min}$ delayed read strobe pulses DRSP1–DRSP4 is read and compared with the pre-set word stored in register 50. If the read data is the same, (i.e., if each one the nibbles read are is the same as the corresponding nibble in the pre-set word), a valid sample increment counter 62 in a window calculator/delay increment module 64 of the training system 24 is incremented, Steps 404B and 404C.

In Step 404D, a determination is made as to whether a predetermined number of, here in this example, 8, valid samples have been obtained (i.e., if each of the nibbles read is the same as the corresponding nibble in the pre-set word). If not, the training system waits for the next read operation of the training system 24 Step 404E. On the other hand, if in Step 404D, a determination is made that a predetermined number of, here in this example, 8, valid samples have been obtained for here 8 consecutive times, Step 404D, a determination is made in Step 404E as to whether a lower boundary has been established for a window of time delays which result in valid data being stored in samplers $30_1$–$30_n$, and if not, the current delay command applied to the time delay 32 by module 64 is marked in module 64 as the lowest time delay in the window of valid time delays for the read strobe pulses, Step 404E.

On the other hand, if in Step 404E it is determined that the lower boundary of a window of time delays which result in valid data being stored in samplers $30_1$–$30_n$, has not been established, the training system waits for the next memory system access by the training system 24, Step 404G.

On the other hand, if in Step 404B, it is determined that any one of the nibbles read is different from the corresponding nibble in the pre-set word, a determination is made as to whether the lower boundary of the of time delays which result in valid data being stored in samplers $30_1$–$30_n$, Step 404H. If the lower boundary has not been found, the current delay applied by the time delay 32 the valid sample counter 60 is reset. Setup 404I. On the other hand, if the lower boundary has been found, the present delay applied to the time delay 32 is marked as the upper time delay for the window of time delays which result in valid data being stored in samplers $30_1$–$30_n$, Step J.

When the upper and lower time delays for the time delays which result in valid data being stored in samplers $30_1$–$30_n$, has been established the optimum time delay $\Delta_O$ is calculated as the mean of the upper and lower time delays. At the end of the training process, the optimum time delay $\Delta_O$ is used during normal user data processing, Step 406, with copy of the users data at the pre-set address being returned to the memory system as described above in connection with FIG. 5.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining a read strobe pulse delay for data read from a memory having a plurality of memory chips, each one of the chips providing data along with an associated read strobe pulse, the data read from each one of the plurality of chips being stored in a corresponding one of a plurality of storage devices in response to the read strobe pulse associated with such one of the plurality of chips, comprising:
   (a) monitoring read requests for the memory from a plurality of resources and from a read strobe pulse delay training system;
   (b) granting access to the memory to the read strobe pulse delay training system in response to the request from the read strobe pulse delay training system;
   (c) operating the training system when such system has been granted access to the memory to determine the read strobe pulse delay, such delay being applied into the plurality of read strobe pulses to enable valid read data from the plurality of memory chips to be stored in each one of the plurality of the storage devices in response to the read strobe pulses being delayed by the read strobe pulse delay; and
   (d) delaying the plurality of read strobe pulses by the determined read strobe pulse delay when read data is subsequently provided from the memory for use by the plurality of resources.

2. The method recited in claim 1 wherein the training system operation comprises:
   (a) loading, in response to a training request signal, a predetermined data into the plurality of chips of the memory at a predetermined address;
   (b) applying a delay to the read strobe pulses to the plurality of storage devices at an initial delay;
   (c) reading data from the memory chips at the predetermined address;
   (d) storing the read data into the storage device in response to the applied delay;
   (e) reading the stored data from the storage device;
   (f) comparing the data read from the storage device to the predetermined data to determine whether the read data is valid or invalid;
   (g) changing the delay applied to the plurality of read strobe pulses,
   (h) repeating steps (c) through (g) for a predetermined number of delays;
   (i) determining the strobe pulse delay in accordance with a predetermined number of valid data read consecutively from the storage device; and
   (j) subsequently applying the determined strobe pulse delay for the read strobe pulses.

3. A method for determining a read strobe pulse delay for data read from a memory having a plurality of memory chips, each one of the chips providing data along with an associated read strobe pulse, the data read from each one of the plurality of chips being stored in a corresponding one of a plurality of storage devices in response to the read strobe pulse associated with such one of the plurality of chips, comprising:
   (a) loading, in response to a training request signal provided by the system during operation of the system in processing the user data, a predetermined data into the memory at a predetermined address;
   (b) applying a delay to the read strobe pulses at an initial delay;
   (c) reading data from the memory chips at the predetermined address;
   (d) storing the read data into the storage device in response to the applied delay;
   (e) reading the stored data from the storage device;
   (f) comparing the data read from the storage device to the predetermined data to determine whether the read data is valid or invalid;
   (g) changing the delay applied to the plurality of read strobe pulses;
   (h) repeating steps (c) through (g) for a predetermined number of delays;
   (i) determining the read strobe pulse delay in accordance with a time window having a predetermined number of valid data read consecutively from the storage device; and
   (j) subsequently using the determined strobe pulse delay and subsequently processing user data until the occurrence of a subsequent training signal.

* * * * *